Patented Mar. 22, 1938

2,111,992

UNITED STATES PATENT OFFICE 2,111,992

LINOLEUM CEMENT AND THE METHOD OF PREPARING THE SAME

Edwin Brew Robinson, Blackley, Manchester, England, assignor to Imperial Chemical Industries Limited, a corporation of Great Britain No Drawing. Application February 25, 1935, Serial No. 8,207. In Great Britain February 27, 1934

6 Claims. (Cl. 134—23.1)

This invention relates to the manufacture of linoleum compositions; and it comprises methods of making such compositions wherein linseed oil, or another fatty oil, is first partially bodied, the product is submitted to "short path" distillation to remove undesirable components and is then oxidized to complete the bodying, the usual gums or resins employed in making linoleum being often admixed with the product prior to the final bodying; all as more fully hereinafter set forth and as claimed.

The "cement" used in making linoleum usually contains as a characteristic ingredient a substance known as "linoxyn"; a product of the oxidation of drying oils. Linoxyn is made by oxidizing linseed oil, either by exposure to the air or by various "boiling" operations (see Morrell & Wood, The Chemistry of Drying Oils, London, 1925, page 166). Other drying and semi-drying oils give similar products. In oxidizing linseed oil by air blowing, the oil is thickened or bodied. A similar degree of bodying can be obtained by a simple heating of linseed oil to a high temperature, higher than that used in air blowing, for a number of hours; this operation being called "polymerization" and, if carried to completion, resulting in ordinary "stand oil". Bodied products obtained by polymerization and by air blowing are different in character, but the same amount of bodying can be attained in either way.

There are various well known ways of making linoxyn and linoleum cement. In the so-called scrim process and in the Walton process the production of linoxyn i. e. the requisite oxidation and thickening of the oil is brought about by allowing the oil to drip over muslin or in drops or by bringing it in other ways into contact with atmospheric oxygen. In the Taylor process the oil is heated with driers, resin is added and air is blown through. The products of the two processes differ and are commonly used for different purposes. Both processes have the disadvantage that much time is taken and much material is held up in the process.

The oil may contain the usual driers, such as litharge, and oxidation, in the scrim process or the Walton process, may be at temperatures between 40° C. and 70° C. In the Taylor process, which is quicker, the temperature used in oxidation is about 150° C.

In the present invention, better products are obtained and a certain number of other advantages gained by a methodical treatment of the oil wherein it is first partially bodied, is thereafter subjected to "short path" distillation to remove undesirable components and is then converted into linoleum cement by the finishing oxidation processes which may be those usual in the art.

Other fatty oils which are potential sources of oxidized products suitable for use in the manufacture of linoleum cement, e. g. fish oils and slower drying oils such as soya bean oil, are in general not used, since they require more prolonged oxidation than linseed oil and yield greasy products, insufficiently tough. Linoleum prepared from such oxidized oils possesses unsuitable mechanical properties. The very objectionable odor of fish oils has also militated against their use in linoleum manufacture.

Under the present invention, an oxidized product from fish oil, such as Japanese sardine oil, can be fused with gums to give a cement furnishing a linoleum superior to that which can be obtained from this oil by older processes.

In the present invention, short path distillation is used to free oils of undesirable components, as in removing unwanted components from the oxidized oils mentioned.

Short path distillation using a high vacuum of the order of a cathode ray vacuum and closely approximated heated and cooled surfaces, has been used in various ways in treating oils for other purposes. It is an intermediate step in the present process wherein oxidized products are made by subjecting to oxidation materials purified in this way.

For example, a bodied linseed oil purified according to the process of British Patent 422,941 (application 35,895 of 1933) into which the requisite amount of drier has been cooked, oxidizes more rapidly and completely than the slightly thickened boiled oil usually employed as starting material for the "scrim" and "Walton" processes. This may be shown by arranging the oxidation conditions so that the slightly thickened boiled oil usually employed gives a linoxyn which fuses readily with rosin and kauri gum to give a melt which rapidly (in say, 5–10 minutes) begins to thicken and gelate. The bodied linseed oil of the usual type referred to, however, oxidizes under the same conditions to give a linoxyn which does not fuse with rosin and kauri gum but gives a pulpy mass which on continued heating gives a "crumb" cement. This indicates that more complete oxidation of the oil has taken place in the latter case. The "crumb" cement is naturally less uniform, but homogenizes quite satisfactorily in the subsequent milling operations.

British Patent 422,941 (corresponding to U. S. application Ser. No. 702,808 by Oosterhof, Van Vlodrop & Waterman, filed Dec. 16, 1933) discloses methods for freeing various other polymerized oils of a drying or semi-drying character, from undesirable non-polymers. Among these other oils, which can be treated by the process of this British patent as one step of our process, are China-wood oil, perilla oil, sterculia oil, soybean oil and the like.

British Patent 442,000 (corresponding to British application No. 32,913/33 and to U. S. application Ser. No. 754,368 by Fawcett & Walker, filed Nov. 22, 1934) discloses evaporative distillation methods of securing valuable oil products from polymerized fish oils, such as polymerized menhaden oil, Japanese sardine oil, herring oil and Canadian pilchard oil. By subjecting such oils to evaporative distillation under the conditions set forth in said patent, viscous oils of enhanced drying properties are secured. The products of this patent can be used in the first step of our process.

British Patent 428,864 (corresponding to British application No. 31,845/33) discloses methods of making improved drying oils by thickening fatty acids derived from various drying and semi-drying oils, subjecting the thickened material to evaporative distillation and then reconstituting an oil by admixture with glycerol. Among the oils the fatty acids of which are mentioned in this British patent as susceptible to treatment by the method disclosed therein, are linseed, tung, perilla, chia, oiticica, soy bean, poppy seed, sunflower seed, hemp seed, safflower seed, candle nut, rubber seed, maize, wheat, cotton seed, croton, rape, menhaden, sardine and herring oils.

The present invention is thus adapted to employ, as raw material, practically any drying or semi-drying oil, of either animal or vegetable origin.

It is evident therefore that the time required to obtain a linoxyn satisfactory for any particular purpose may be considerably reduced by using as starting materials the purified oils mentioned above. It is a further advantage that the oxidized products obtained according to the present invention are tougher and more elastic than the products of hitherto known processes.

The application of the process of the invention to treated drying oils of marine animal origin and to relatively slow drying oils of vegetable origin such as soya bean oil results in a greater increase in the rate of oxidation than in the case of linseed oil. Hence the linoxyn like products obtained from such treated oils approximate closely to those obtained by the normal process using linseed oil, i. e. they are tough, elastic and only very slightly greasy to the touch.

The invention is illustrated but not limited by the following examples in which the parts are by weight.

Example 1

The treated oil used in this example is made as follows:—

1,000 parts of linseed oil are heated at 285–295° C. in an atmosphere of carbon dioxide with good agitation until the oil attains a viscosity of 25.8 poises at 20° C. The bodied oil is then passed at 220–230° C. through a continuous still under a high vacuum, such as that employed in the recited British application, and 200 parts are distilled off and rejected. Vacua as low as 2 and 3 mm. have been used.

In utilizing such a treated oil, 150 parts of the resulting stand oil (viscosity 63 poises at 20° C.) and 3 parts of litharge are heated with good agitation for 5 hours at 180–185° C. The oil is then oxidized by allowing it to flow over the surface of a tinned iron tray inclined at an angle of about 60° to the horizontal and fitted inside an electrically heated oven maintained at a temperature of 40°–45° C. A slow stream of air is passed continuously through the oven. The tray is suitably shaped to collect any excess oil which drains to the bottom. The tray is reversed every 8 hours to allow the oil which has collected at the base, to run over the film of already oxidized material adhering to its surface. Where necessary even distribution of the oil is effected with the help of a brush. Fresh supplies of oil are placed on the tray when required.

In this way a slightly tacky, but nongreasy linoxyn is obtained. The product is superior to linoxyn prepared from ordinary linseed oil under the same conditions in that it is tougher, more elastic, and more highly oxidized.

A cement, from which a satisfactory linoleum mix can be made, is prepared in the following way: Rosin (7.5 parts) is heated to 170° C. and the above linoxyn (40 parts) is added with good stirring during 10 minutes, while the temperature is allowed to fall to 150–160° C. Five minutes later kauri gum (2.5 parts) is added, the mix well stirred and heated for 10 minutes at 150–160° C. The gelled mass is then poured and cooled.

A linoleum mix which works readily on a two roll mill and can be calendered, is made by milling together the cement (20 parts), wood meal (25 parts) and pigment (ultramarine: 12 parts). When calendered the mix forms a flexible tough sheet.

Example 2

The treated oil used in this example is made as follows:—

1,000 parts of linseed oil are heated to 120–125° C. and a vigorous stream of air blown through the oil at this temperature until it attains a viscosity of 27 poises at 27° C. The blown oil is then passed at 230–235° C. through a continuous still as described under Example 1 and 180 parts are distilled off and rejected.

In utilizing this treated oil, 150 parts of the air blown linseed oil (viscosity 63 poises at 20° C.), and 3 parts of litharge are heated, with good agitation, at 180°–185° C. for ½ hour. The oil is then oxidized at 40–45° C. as described in Example 1. The linoxyn so obtained is somewhat less tough than that obtained by the process of Example 1 but is still superior in both toughness and elasticity to the linoxyn obtained under identical conditions from linseed oil.

A cement is obtained from this oil using conditions identical with those given in Example 1. The cement closely resembles that obtained from a molecular still treated stand oil in appearance, but when incorporated with wood meal and pigment in a two roll mill the mix is "shorter", i. e. less flexible than that prepared from the treated stand oil. It is, however, more flexible than a mix derived from untreated linseed oil and when calendered gives a tough, elastic sheet slightly softer than that obtained from a molecular still treated stand oil.

Example 3

The treated oil used in this example is made as follows:—

1,000 parts of Japanese pale sardine oil are heated, with good agitation, in an atmosphere of carbon dioxide, at 295–300° C. until a viscosity of 25 poises at 20° C. is attained. The bodied oil is then passed, at 225–235° C., through a continuous still at high vacuum as described in Example 1, and 190 parts distilled off.

In the present invention, 150 parts of the so-treated Japanese sardine oil converted into stand oil (58 poises at 20° C.) and 3 parts of litharge, are heated at 180–185° C. with good agitation for 5 hours. The oil is then oxidized at 40–45° C. in an oven as described in Example 1. The oxidized oil is superior to that obtained in a similar way from untreated Japanese sardine oil in that it is more elastic thereby approaching in properties the linoxyn obtained from linseed oil.

When fused with rosin and kauri gum using the quantities and temperature stated in Example 1, it gives a mobile melt which slowly thickens on continued heating. After 3 hours at 150–160° C. it is sufficiently thick to be poured. The cement is somewhat soft but very tough and more elastic than that obtained from untreated sardine oil under similar conditions.

On mixing on a two roll mill with wood meal and pigment (quantities as in Example 1) a very plastic mix is obtained which calenders readily to a smooth sheet. It is at this stage where the advantage of molecular still treatment of the oil becomes most evident. The cement made from untreated sardine oil is much less plastic and on incorporation with wood meal and pigment gives a mix which is "short" on the mill and difficult to calender satisfactorily.

*Example 4*

The treated oil used in this example is made as follows:—

1,000 parts of Japanese pale sardine oil are heated to 120° C. and a vigorous stream of air blown through at this temperature until the viscosity rises to 28 poises at 20° C. The bodied oil is then passed through a continuous molecular still at 225–235° C. and 210 parts removed as distillate.

In the present invention, 150 parts of the air blown Japanese sardine oil and 3 parts of litharge are heated with good agitation at 180–185° C. for ½ hour. The oil is oxidized at 40–45° C. as described in the previous examples. The oxidized oil is slightly greasy but more elastic than the oxidized untreated sardine oil. When heated with rosin and kauri gum a cement is obtained which can readily be incorporated with wood meal and pigment on a two roll mill to give a tough but somewhat "short" mix. The mix, is, however, more flexible than that obtained starting with untreated sardine oil and is much more easily calendered to a smooth sheet.

I claim:

1. In the manufacture of linoleum cement and linoleum, the process which comprises bodying a fatty oil having at least some drying properties, freeing it of undesirable components by short path distillation and finally oxidizing it to the desired consistency.

2. In the process of claim 1, bodying by air oxidation.

3. In the process of claim 1, bodying by a partial oxidation.

4. In the process of claim 1, imparting additional body to the oil prior to final oxidation by incorporating gums thereinto.

5. In the manufacture of high grade linoleum cement and linoleum from fish oils, the process which comprises bodying such a fish oil, removing undesirable components by short path distillation and, finally, oxidizing.

6. In the manufacture of linoleum cement and linoleum, the process which comprises bodying fatty acids of the class consisting of drying oil fatty acids and semi-drying oil fatty acids, freeing the bodied fatty acids of undesirable components by short path distillation, esterifying the fatty acids with glycerol to secure a fatty oil having drying properties, and oxidizing the oil to the desired consistency.

EDWIN BREW ROBINSON.